United States Patent

Piekny et al.

[11] Patent Number: 6,131,999
[45] Date of Patent: Oct. 17, 2000

[54] FOLDING VEHICLE SEAT ASSEMBLY

[75] Inventors: Mark Piekny, Plymouth; Majid (Jack) Hammoud, Dearborn, both of Mich.

[73] Assignee: Ford Motor Company, Dearborn, Mich.

[21] Appl. No.: 09/444,744

[22] Filed: Nov. 22, 1999

[51] Int. Cl.$^7$ ...................................................... B60N 2/02
[52] U.S. Cl. ..................... 297/378.12; 297/341
[58] Field of Search .............................. 297/341, 378.1, 297/378.12, 378.14, 362.11; 296/65.01, 65.17

[56] References Cited

U.S. PATENT DOCUMENTS

| | | |
|---|---|---|
| 3,114,574 | 12/1963 | Pryale . |
| 4,627,656 | 12/1986 | Gokimoto et al. . |
| 4,736,985 | 4/1988 | Fourrey et al. . |
| 5,000,283 | 3/1991 | Krieg . |
| 5,195,795 | 3/1993 | Cannera et al. . |
| 5,306,073 | 4/1994 | Rees . |
| 5,393,116 | 2/1995 | Bolsworth et al. . |
| 5,393,123 | 2/1995 | Hernandez et al. . |
| 5,482,349 | 1/1996 | Richter et al. . |
| 5,570,931 | 11/1996 | Kargilis et al. . |
| 5,588,707 | 12/1996 | Bolsworth et al. . |
| 5,934,732 | 8/1999 | Jakubiec . |

FOREIGN PATENT DOCUMENTS 2 251 183  7/1992  United Kingdom .

*Primary Examiner*—Milton Nelson, Jr.
*Attorney, Agent, or Firm*—Gregory P. Brown; Roger L. May

[57] ABSTRACT

A folding vehicle seat assembly includes a seat back pivotally movable between upright and folded positions, with a latch assembly operative to latch the seat back in the upright position. A drive motor is engaged with a worm gear. A follower block is driven by the worm gear and operatively engageable with the latch assembly for unlatching the seat back. A seat block is movable with the follower block and operatively connected with the seat back for pivoting the seat back to the folded position after the follower block unlatches the seat back.

10 Claims, 6 Drawing Sheets

FOLDING VEHICLE SEAT ASSEMBLY

TECHNICAL FIELD

The present invention relates to a vehicle seat assembly including a motor operative to unlatch a seat latch assembly and to fold the seat back forward to a collapsed position.

BACKGROUND OF THE INVENTION

Many modern vehicle designs include foldable and collapsible rear seat assemblies to improve cargo capacity of vehicles, particularly minivans and SUvs. Some vehicles provide seat assemblies which are collapsible to a substantially flat position in the vehicle to create a cargo load floor wherein the vehicle cargo is supported on top of the flattened seat assemblies. However, such assemblies are typically complex, bulky, and cumbersome for the average user to operate. Generally, the seat assemblies are heavy and require actuation of release levers, which may cause difficulty in collapsing the seat assembly within the confined space of a vehicle interior.

It is, therefore, desirable to provide a vehicle seat assembly which does not require manual operation for collapsing the assembly to a load floor position.

DISCLOSURE OF INVENTION

The present invention overcomes the abovereferenced shortcomings of prior art vehicle seat assemblies by providing a folding vehicle seat assembly which includes a drive motor and worm gear, and a lost motion assembly operatively connecting the worm gear with a latch assembly and seat back for selectively unlatching the latch assembly and pivoting the seat back to a folded position.

More specifically, the present invention provides a folding vehicle seat assembly including a seat back pivotally movable between upright and folded positions, and a latch assembly operative to latch the seat back in the upright position. A drive motor rotatably drives a worm gear. A follower block is driven by the worm gear and operatively engageable with the latch assembly for unlatching the seat back for pivotal movement. A seat block is movable with the follower block and operatively connected with the seat back for pivoting the seat back to the folded position after the follower block unlatches the seat back.

Accordingly, the invention eliminates the need for a solenoid or additional electric device to activate the latch mechanism, and thus makes the conversion of a manual seat system into a power seat system simpler, reducing cost and weight.

Therefore, an object of the invention is to provide an improved folding seat assembly wherein a single worm gear and motor combination provides linear motion to both unlatch and fold a vehicle seat back.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1A:
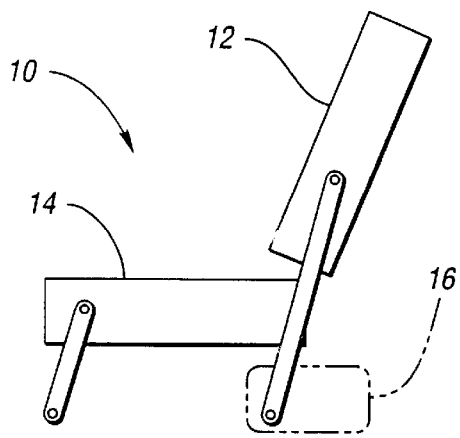
FIG. 1a shows a schematic side view of a seat assembly in an upright position in accordance with the present invention.
Figure 1B:
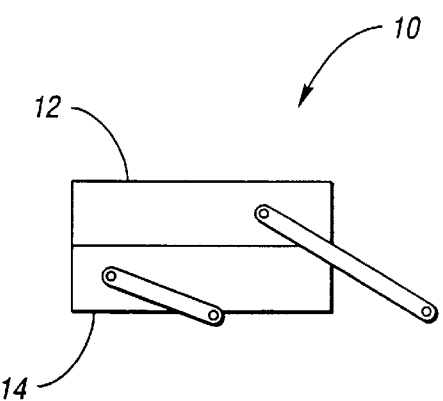
FIG. 1b shows a schematic side view of the seat assembly of FIG. 1a in the folded position.

Referring to FIGS. 1a and 1b, schematic side views are shown of a folding vehicle seat assembly 10 in the upright and collapsed positions, respectively. The seat assembly 10 includes a seat back 12 and lower seat 14 with a seat folding assembly 16 positioned below the rear of the lower seat 14. As shown in FIG. 1b, when collapsed to the folded position, the seat back 12 may form a load floor in the vehicle for supporting cargo.

Figure 2:
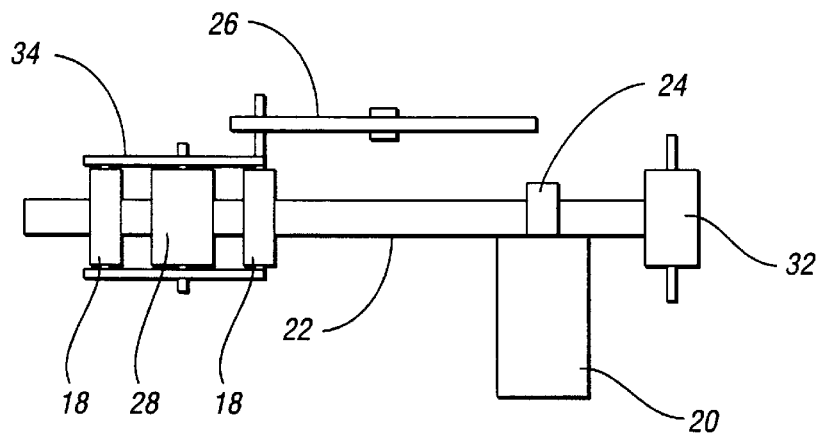
FIG. 2 shows a schematic plan view of a folding vehicle seat assembly in accordance with a first embodiment of the invention.

In the upright, deployed position the device is as shown schematically in FIG. 2. Upon activation of the drive motor 20, rotation of the worm gear 22 causes the follower block 18 to move to the left as viewed in FIG. 2 along the worm gear 22. A right angle reduction gear 24 is provided between the drive motor 20 and the worm gear 22. During this initial portion of the stroke, the latch 26 is unlocked but the seat back 12 does not move due to the follower block 18 having not yet butted up against the seat block 28. Complete unlatching is synchronized with seat folding actuation, i.e., follower block 18 seat block 28 contact. The seat block 28 is connected to an extension arm 30 (shown in FIG. 3) which rotates a 4-bar link system that ultimately folds the seat flat. The worm gear 22 and motor 20 are mounted on a pivot 32 to allow sweeping movement of the seat block 28 along the arc of the extension arm 30. Note that the follower block 18 is really two blocks coupled together by a seat block armature 34 and moves in concert with the rest of the assembly. Also note that seat block 28 is not meshed to the worm gear 22.

Figure 3:
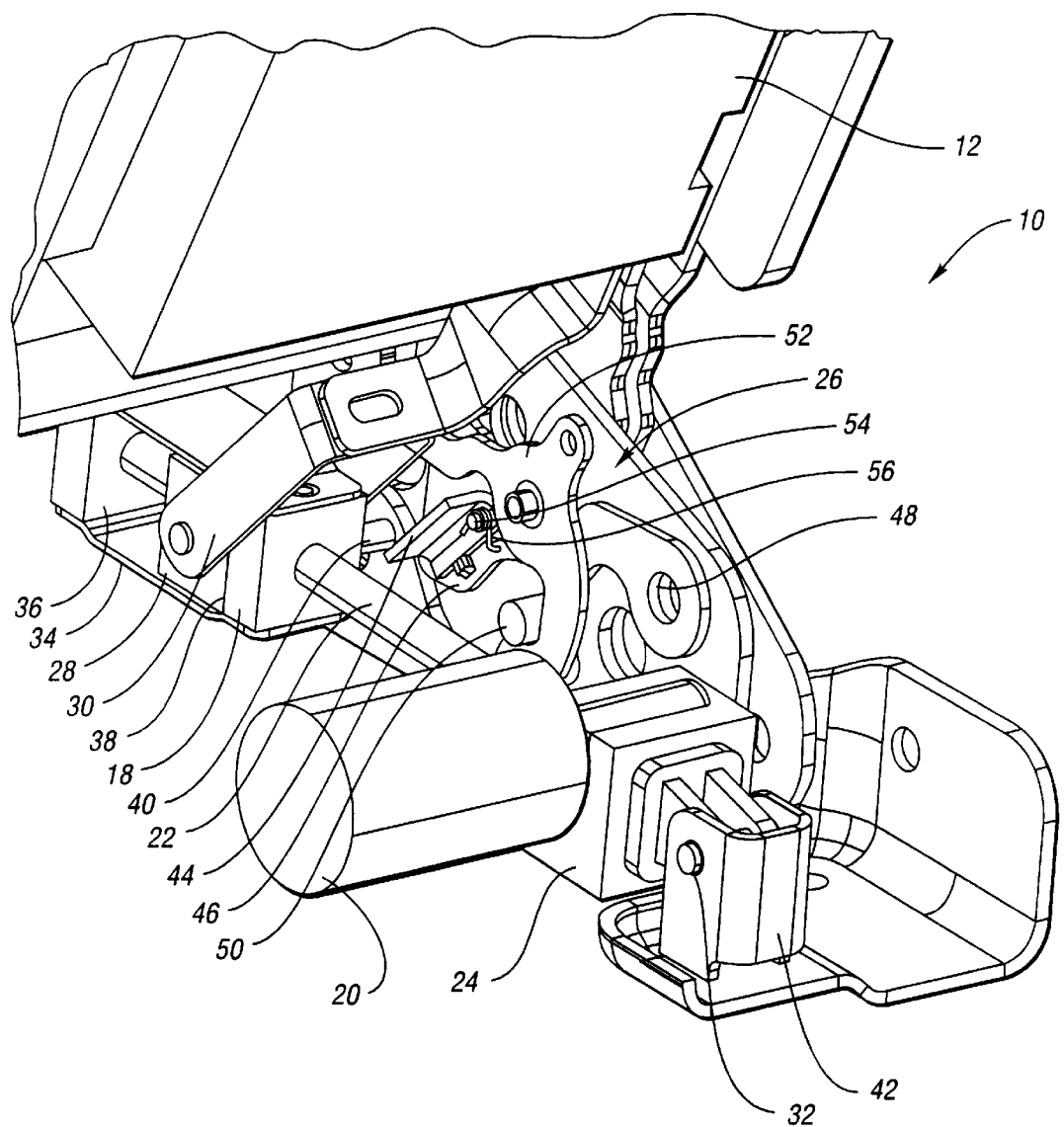
FIG. 3 shows a perspective view of a seat assembly corresponding with the embodiment of FIG. 2.
Figure 4:
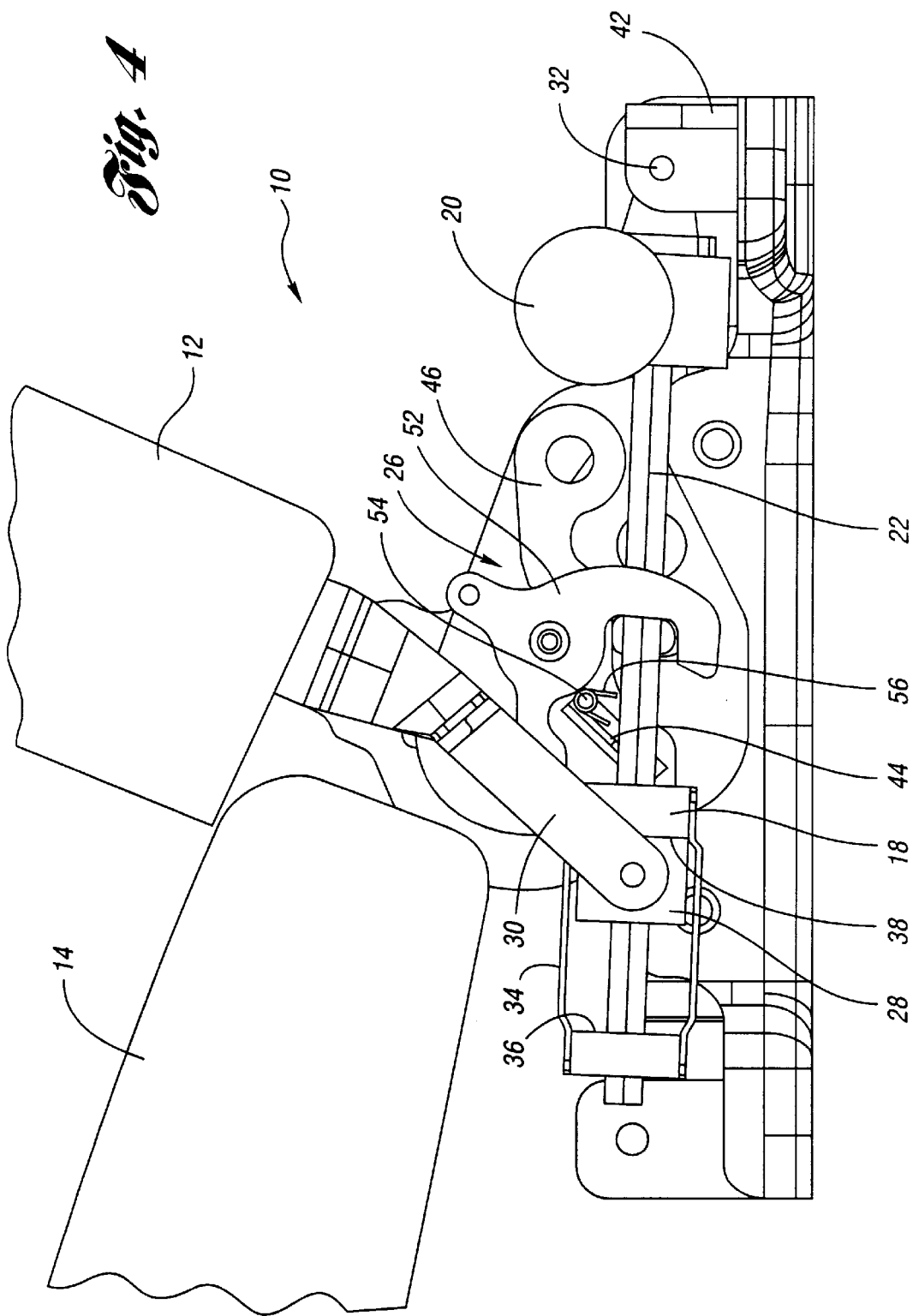
FIG. 4 shows a side view of the assembly of FIG. 3 with the seat back in the upright position.

The invention will now be described in greater detail with reference to FIGS. 3–7, wherein like reference numerals refer to like components shown in FIG. 2. Referring specifically to FIGS. 3 and 4, the vehicle seat assembly 10 includes the seat back 12 which is pivotally movable between upright and folded positions. A latch assembly 26 is operative to latch the seat back 12 in the upright position. A drive motor 20 is operatively engaged with a reduction gear 24 and worm gear 22 for driving the follower block 18, which includes first and second ends 36,38 for alternatively engaging the seat block 28 for pivoting the seat back between the upright and folded positions by rotating the extension arm 30. The follower block 18 includes a pin 40 which is engageable with the latch assembly 26 for selectively unlatching the seat back 12 to allow pivotal movement of the seat back 12, as described below.

The worm gear 22 is pivoted to a floor bracket 42 at a pivot joint 32 to enable the seat block 28 to follow the arc of the pivoting extension arm 30.

When the drive motor 20 is activated, the worm gear 22 rotates, causing the follower block 18 to move to the right as viewed in FIGS. 3 and 4. With this movement, the pin 40 contacts the ramp 44, which pivots the latch member 46 downward about its pivot point 48. The latch member 46 engages the cam 50 and pushes it downward, and simultaneously rotates the second latch member 52 to allow the cam 50 to continue downward, thereby unlatching the latch 26, thus allowing pivotal movement of the seat back 12. However, the ramp 44 is pivotally attached to the latch member 46 at the pivot joint 54 and spring-loaded by the spring 56 in order to allow the ramp 44 to clear out of the way when the pin 40 is moved from right to left as viewed in FIGS. 3 and 4. The structure of the latch assembly 26 is not an important feature of the invention, and is commonly available from various automotive suppliers, such Faurecia Automotive Seating of Troy, Michigan.

Figure 5:
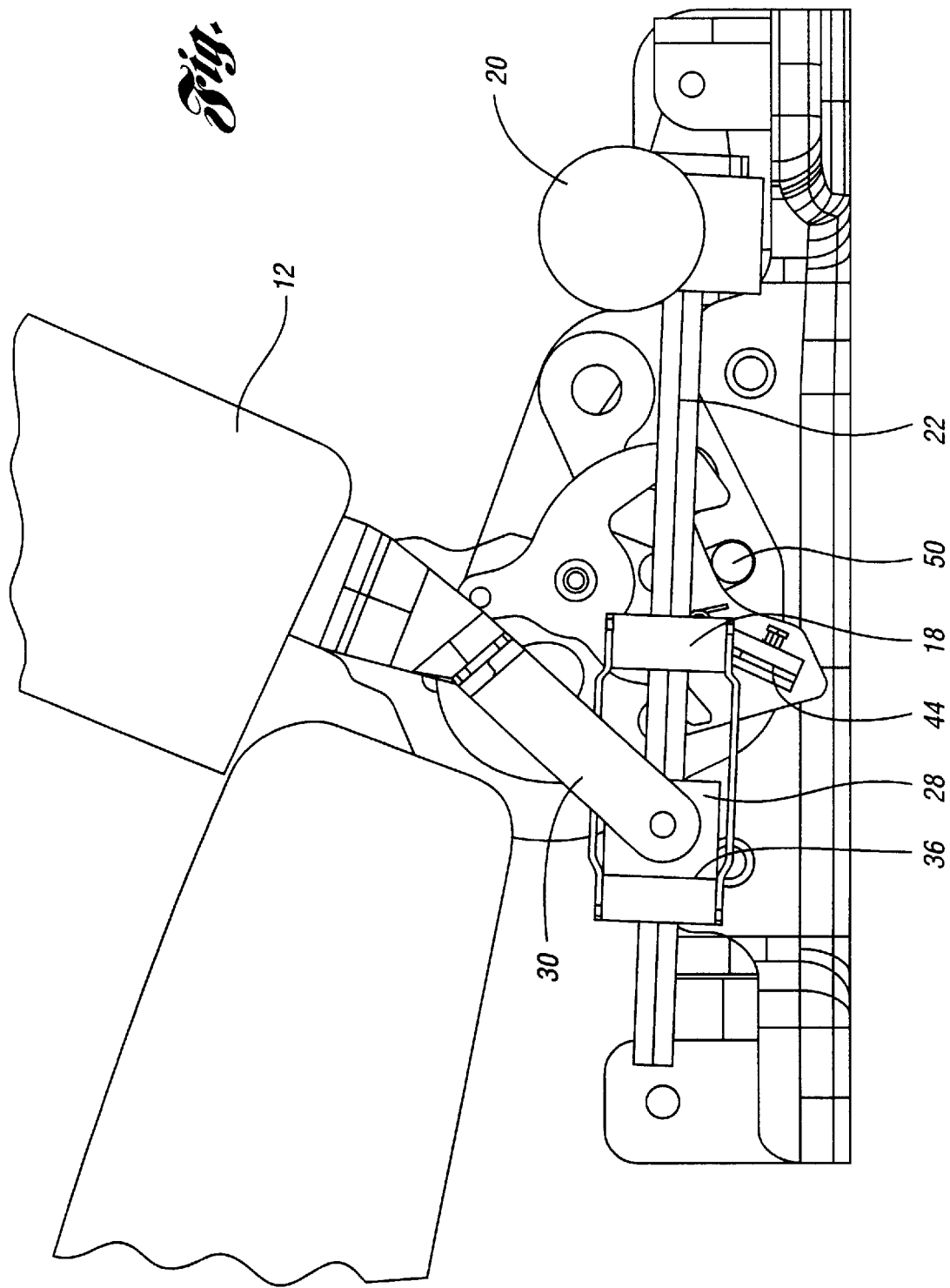
FIG. 5 shows a side view of the assembly of FIG. 4 with the seat back unlatched.

Accordingly, between the positions of FIGS. 4 and 5, the follower block 18 has moved to the right, thereby causing the pin 40 to engage the ramp 44, pivoting the latch members 46,52, and moving the cam 50 downward to unlatch the latch assembly 26. At the position shown in FIG. 5, the cam 50 has moved fully downward as shown, and the seat block 28 has bottomed out against the first end 36 of the follower block 18. At this point, continued rotation of the worm gear 22 by the drive motor 20 causes the follower block 18 and seat block 28 to move from left to right as viewed in FIG. 5, thus pivoting the extension arm 30, and rotating the seat back 12 to the folded position shown in FIG. 6.

Figure 6:
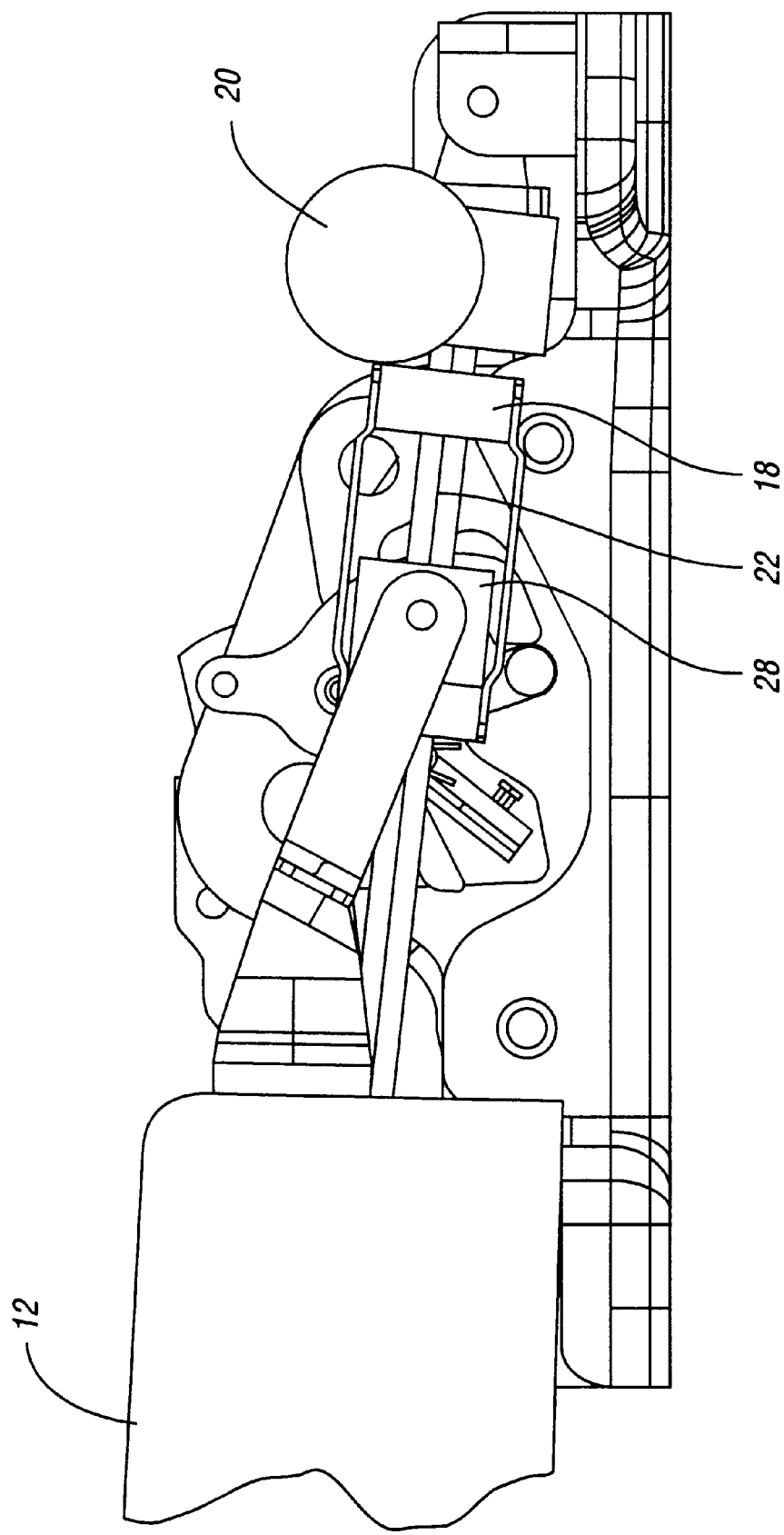
FIG. 6 shows a side view of the assembly of FIG. 5 with the seat back in the folded position.
Figure 7:
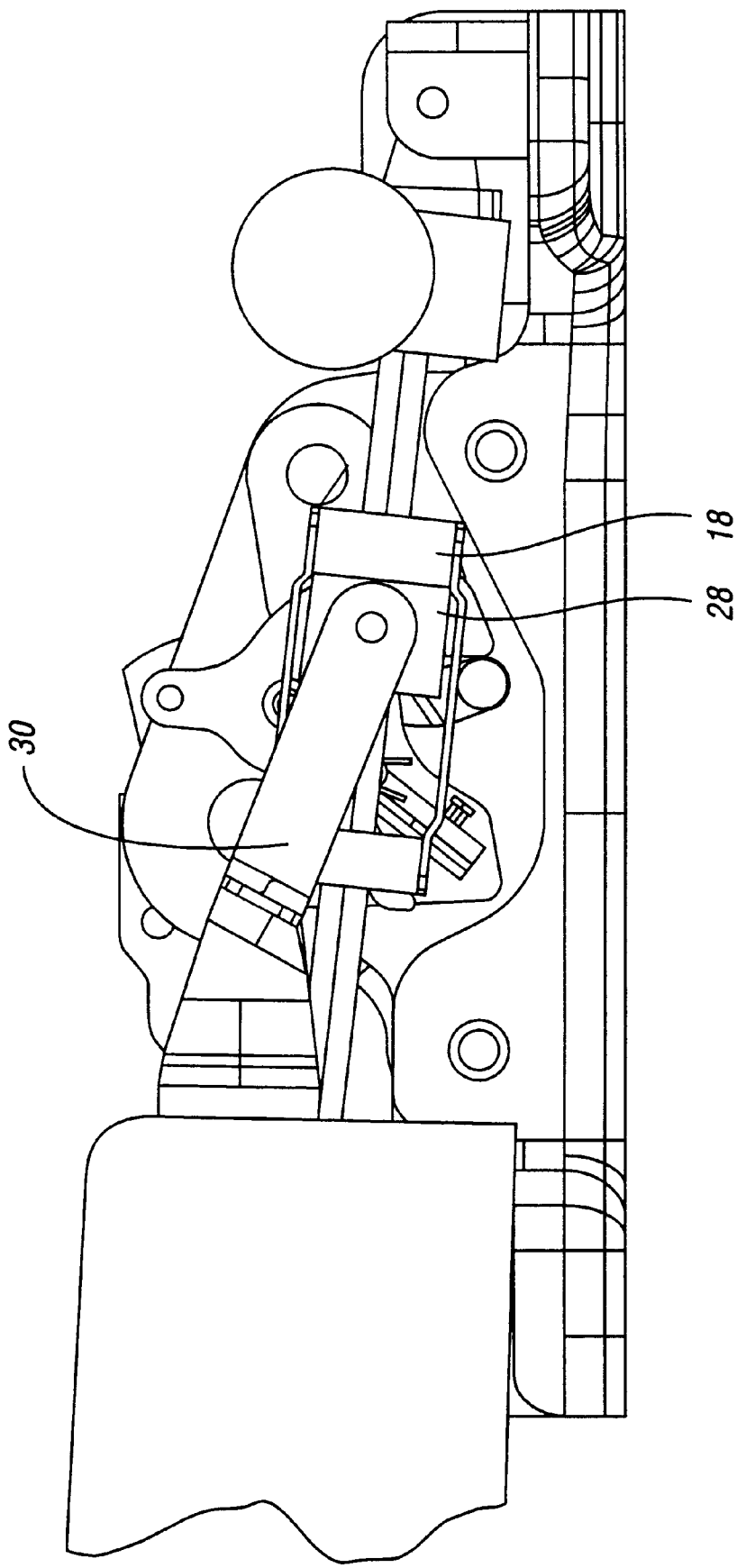
FIG. 7 shows a side view of the assembly of FIG. 6 with the seat back returning to the upright position.

From the folded position in FIG. 6, in order to raise the seat back 12 to the upright position, the drive motor 20 is reversed, thereby reversing the rotational direction of the worm gear 22, and initiating right to left movement of the follower block 18. Between the positions shown in FIGS. 6 and 7, there is lost motion, as the follower block 18 moves toward the seat block 28. When the follower block 18 abuts the seat block 28, further movement of the follower block will cause the seat block 28 to be moved from right to left as viewed in FIG. 7, thereby pivoting the extension arm 30 and rotating the seat back 12 toward the upright position. In order to allow such movement, the pin 40, shown in FIG. 3, abuts and pivots the ramp 44 against the load of the spring 56, and the pin 40 continues to move past the ramp 44 after such pivoting to allow actuation of the seat back 12 to the fully upright position shown in FIG. 4.

The seat block 28 includes a cental aperture which receives the worm gear 22 therethrough with clearance therebetween.

Figure 8:
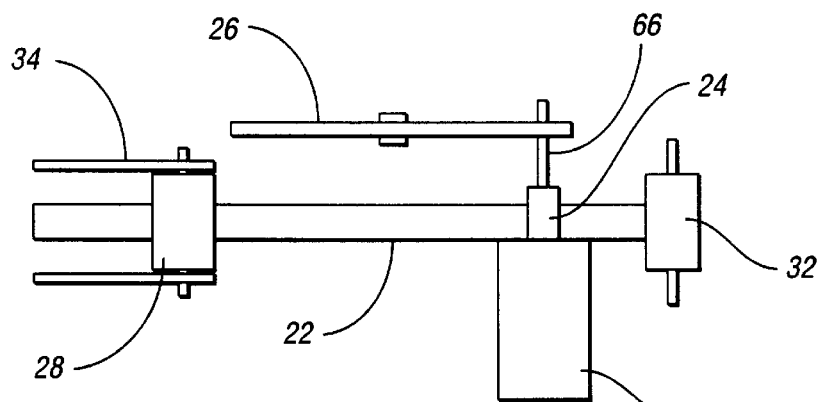
FIG. 8 shows a schematic plan view of a folding seat assembly in accordance with an alternative embodiment of the invention.

Turning to FIG. 8, an alternative embodiment of the invention is shown, with the pin 66 replacing the pin 40 shown in FIG. 3. In other words, the motor 20 and seat block 28 replace the follower block 18 of the concept shown in FIG. 2. This eliminates parts, but requires the motor 20 to move along the worm gear 22, with the pin 66 serving as the latch actuator. Upon activation from the seat upright configuration, the locked latch prevents the seat block 28 (now meshed to the worm gear 22) from moving, which causes the motor (in a neutral position) to move in the opposite direction along the worm gear. As the motor butts up against the end of the worm gear 22, the latch 26 is simultaneously unlocked and the motor 20 is free to turn the seat block in the other direction, thus initiating the fold-flat motion.

While the best modes for carrying out the invention have been described in detail, those familiar with the art to which this invention relates will recognize various alternative designs and embodiments for practicing the invention within the scope of the appended claims.

What is claimed is:

1. A folding vehicle seat assembly comprising:

a seat back pivotally movable between upright and folded positions;

a latch assembly operative to latch the seat back in said upright position;

a drive motor;

a worm gear driven by said drive motor;

a follower block driven by said worm gear and operatively engageable with said latch assembly for unlatching the seat back; and a seat block movable with said follower block and operatively connected with the seat back for pivoting the seat back to the folded position after said follower block unlatches the seat back.

2. The folding vehicle seat assembly of claim 1, wherein said worm gear is pivotally supported at one end by a floor bracket.

3. The folding vehicle seat assembly of claim 1, wherein said follower block and seat block form a lost motion assembly.

4. The folding vehicle seat assembly of claim 3, wherein said follower block comprises first and second ends threaded to said worm gear, and said seat block is positioned between said first and second ends.

5. The folding vehicle seat assembly of claim 4, wherein said seat block includes a cental aperture receiving the worm gear therethrough.

6. The folding vehicle seat assembly of claim 1, wherein said latch assembly includes a ramp pivotally connected to a latch member and spring-loaded with respect to the latch member, and said ramp being engageable with a pin extending from the follower block when the follower block moves in a first direction for pivoting the latch member to unlatch the latch assembly, and said pin being operative to pivot the ramp against said spring load to allow movement of the follower block in a second direction opposite the first direction.

7. The folding vehicle seat assembly of claim 1, further comprising an arm operatively connecting the seat block to the seat back for pivoting the seat back.

8. A folding vehicle seat assembly comprising:

a seat back pivotally movable between upright and folded positions;

a latch assembly operative to latch the seat back in said upright position;

a drive motor;

a worm gear driven by said drive motor; and a lost motion assembly operatively engaged with the worm gear, the latch assembly and the seat back for selectively disengaging the latch assembly and pivoting the seat back to the folded position after unlatching the latch assembly.

9. The folding vehicle seat assembly of claim 8, wherein said lost motion assembly comprises a follower block driven by the worm gear and operatively engaged with the latch assembly for unlatching the seat back; and a seat block movable with the follower block and operatively connected with the seat back for pivoting the seat back to the folded position after the follower block unlatches the seat back.

10. The folding vehicle seat assembly of claim 9, wherein said worm gear is pivotally supported at one end by a floor bracket.

* * * * *